US011934897B2

(12) United States Patent
Vasiljevic et al.

(10) Patent No.: US 11,934,897 B2
(45) Date of Patent: Mar. 19, 2024

(54) APPLICATION DATA FLOW GRAPH EXECUTION USING NETWORK-ON-CHIP OVERLAY

(71) Applicant: Tenstorrent Inc., Toronto (CA)

(72) Inventors: Jasmina Vasiljevic, Toronto (CA); Davor Capalija, Toronto (CA); Zahi Moudallal, Toronto (CA); Utku Aydonat, Toronto (CA); Joseph Chu, Toronto (CA); S. Alexander Chin, Toronto (CA); Ljubisa Bajic, Toronto (CA)

(73) Assignee: Tenstorrent Inc., Toronto (CA)

( * ) Notice: Subject to any disclaimer, the term of this patent is extended or adjusted under 35 U.S.C. 154(b) by 175 days.

(21) Appl. No.: 17/163,124

(22) Filed: Jan. 29, 2021

(65) Prior Publication Data
US 2022/0245009 A1 Aug. 4, 2022

(51) Int. Cl.
*G06F 9/54* (2006.01)
*G06F 15/173* (2006.01)

(52) U.S. Cl.
CPC ........ *G06F 9/547* (2013.01); *G06F 15/17337* (2013.01)

(58) Field of Classification Search
None
See application file for complete search history.

(56) References Cited

U.S. PATENT DOCUMENTS

| | | | |
|---|---|---|---|
| 9,641,435 B1 * | 5/2017 | Sivaramakrishnan | G06F 9/45558 |
| 2003/0053470 A1 * | 3/2003 | Divivier | H04L 49/108 370/428 |
| 2015/0067191 A1 * | 3/2015 | Makhervaks | H04L 67/10 709/244 |
| 2016/0277201 A1 * | 9/2016 | Thubert | H04L 1/188 |
| 2020/0403903 A1 * | 12/2020 | Xie | H04L 12/1836 |
| 2021/0075633 A1 * | 3/2021 | Sen | G06F 12/1081 |

OTHER PUBLICATIONS

Extended European Search Report dated Jun. 14, 2022 from EP Application No. 22153911.7, 9 pages.
(Continued)

*Primary Examiner* — Umut Onat
(74) *Attorney, Agent, or Firm* — Daylight Law, P.C.

(57) ABSTRACT

Methods and systems for executing an application data flow graph using a network of computational nodes are disclosed. In specific examples, the network of computational nodes can be a network-on-chip for a multicore processor. One method includes transitioning first application data from a first source computational node to an intermediary computational node. The method can also include providing second application data, from a computation layer of the network of computational nodes, on the intermediary computational node. The method can also include multicasting the first application data in combination with the second application data from the intermediary computational node to at least two destination computational nodes. The first source computational node, the intermediary computational node, and the at least two destination computational nodes are all in the network of computational nodes.

20 Claims, 10 Drawing Sheets

(56) References Cited

OTHER PUBLICATIONS

M. P. Dieben et al., "Parallel Simulation of Handshake Circuits", Feb. 26, 1994, Eindhoven University of Technology, chapters 5.2.3 and 5.2.4, pp. 33-38.
Shalaby Ahmed et al.., "Study of Application of Network Coding on NoCs for Multicast Communications", 2013 IEEE 7th International Symposium on Embedded Multicore Socs, IEEE, Sep. 26, 2013, pp. 37-42.
The Linley Group: "Tenstorrent: Relegating the Important Stuff to the Compiler", Dec. 1, 2020, URL:https://www.youtube.corn/watch?v=Uls3-UWm-sY.

* cited by examiner

APPLICATION DATA FLOW GRAPH EXECUTION USING NETWORK-ON-CHIP OVERLAY

BACKGROUND

Processing cores can cooperatively execute complex computations by executing component computations of that complex computations in distributed fashion across the processing cores. To do so, the processing cores need to share data required for the execution of those component computations as well as receive instructions regarding which component computations they have been assigned. The technology associated with how the complex computation is broken down into component computations and assigned to the various processing cores is associated with the field of parallel computing.

Processing cores can be connected via a network to facilitate the exchanges of data associated with parallel computing. Each processing core can be connected to the network via a dedicated router. When the processing cores are located on a single chip, the network can be referred to as a network-on-chip (NoC). Data can be transmitted amongst the cores using unicast, multicast, or broadcast transmissions. The transmissions can be single-hop or multi-hop depending upon how the cores are connected and the physical location of the source and destination cores within the network. For example, adjacent cores may be able to communicate using a single-hop transmission while distal cores might need to communicate via multi-hop transmissions as data is passed in series between adjacent routers and forwarded from each intermediate router on to the final destination router.

FIG. 1 illustrates a portion of a NoC 100 in which four processing cores 101, 102, 103, and 104 are linked by a network. The network includes a set of buses which communicate with each processing core using a dedicated router 110, 111, 112, and 113. The routers communicate with their associated processing core using a network interface unit (NIU). The set of buses include wires connecting the routers to each other and the routers to their NIUs. The NIU is instantiated in hardware on the processing core. The processing cores execute the component computations they have been assigned using a memory and a processing pipeline. The inputs and outputs of the component computations are routed using the routers under the control of the NIUs. The NIUs are low-level components and can execute data transmissions using corresponding low-level memory copy primitives in which a local segment of memory on a processing core is copied to a remote segment of memory on another processing core. In the basic case of a single-hop unicast data transmission, the memory copy operation involves copying a buffer of a limited fixed size from memory on a source core and writing it to a buffer in a memory on the destination core via the buses. To transmit larger amounts of data, the system can issue multiple memory copy operations.

FIG. 1 also illustrates a layer diagram 150 of the same NoC 100. In layer diagram 150, blocks with sharp edges indicate hardware while blocks with rounded edges indicate software instantiated by the hardware on which the block is stacked. The layer diagram shows computation layer 151 which is instantiated by instructions executed by the processing pipelines and stored in the memories of each of the processing cores, and the NoC layer 152 which is instantiated by instructions executed by the NIUs, routers, and buffers on the various cores that implement the low-level primitives associated with transmissions of data among the cores. The concept of executing instructions is used herein to describe the operation of a device that conducts any logic or data movement operations, even if the "instructions" are specified entirely in hardware (e.g., an AND gate executes an "AND" instruction). The term, when used with reference to a device, is not meant to impute the ability to be programmable to that device. Indeed, those of ordinary skill in the art will recognize that NIUs are not highly configurable or programmable. The instructions to execute a low level primitive such as the memory copy operation in the single-hop unicast data transmission example mentioned above are still fairly numerous and involve identifying the remote segment of memory to which the data will be copied, assuring that the remote segment of memory has enough space for the copy operation, keeping track of and reserving a local segment of memory, providing the NIU with the data itself and the address for each piece of the data to be transmitted, and also tracking the status of the memory copy operation. In the case of larger buffers, the instructions also involve breaking it up into multiple memory copy operations.

The NoC layer 152 abstracts only the transfer of a fixed piece of data (via the low-level memory copy primitive) away from the purview of the computation layer 151. As described above, computation layer 151 is still involved with software instructions that initiate and track the status of the memory copy operation. In addition, computation layer 151 also participates in multi-core data flow management and control at a level above the simple memory copy operations. In practice, the workload of the computation layer in this regard includes the management of the data structures into which the data will be written, keeping track of the location of those data structures, polling source cores to see if data is ready for inbound transfers, and transmitting signals to destination cores to alert them that data is ready for outbound transfers. For example, the computation layer will manage a write pointer for a FIFO in memory and will need to deal with situations such as when the FIFO becomes full or in which multiple cores are requesting to write to the same destination FIFO at the same time, and then arbitrate among these write attempts.

SUMMARY

Methods and systems related to the field of data management for networks of computational nodes are disclosed herein. An example of a network of computational nodes is a network on a chip (NoC) and an example of the computational nodes are processing cores in a multicore processor. The computational nodes can be cooperating in the execution of a complex computation for which an application data flow graph is required to be executed in order for the data involved with the complex computation to be distributed through the system. The application data flow graph can describe how data needs to flow through the system between the computational nodes for the complex computation to be executed.

In specific embodiments disclosed herein, the network of computational nodes utilizes a network overlay layer and network overlay graph to efficiently execute an application data flow graph. The network overlay layer can logically isolate the computation layer of the network of computational nodes from the network layer of the network of computational nodes leaving the computational node free to focus on computation. The network overlay graph can enhance the efficiency of the transmission of data through the network. The detailed description below includes examples of how the network overlay graph can be compiled and assigned to computational nodes in the network, and how the instructions to implement the network overlay graph, by the network overlay layer, can be compiled. In specific embodiments of the invention, the network overlay graph is compiled and assigned to computational nodes in the network in a manner that maximizes the replacement of unicasts of the same data by multicasts.

In specific embodiments of the invention, a method for executing an application data flow graph using a network of computational nodes is provided. The method includes transitioning first application data from a first source computational node to an intermediary computational node. The method can also include providing second application data, from a computation layer of the network of computational nodes, on the intermediary computational node. The method can also include multicasting the first application data in combination with the second application data from the intermediary computational node to at least two destination computational nodes. The first source computational node, the intermediary computational node, and the at least two destination computational nodes are all in the network of computational nodes.

In specific embodiments of the invention, a method for executing an application data flow graph using a network of computational nodes is provided. The method includes transitioning first application data from a first source computational node to an intermediary computational node. The method includes transitioning second application data from a second source computational node to the intermediary computational node. The multicasting of the first application data in combination with the second application data is from the intermediary computational node to at least two destination computational nodes. The first and second source computational nodes, the intermediary computational node, and the at least two destination computational nodes are all in the network of computational nodes.

In specific embodiments of the invention, the network overlay layer comprises programmable stream controllers distributed across the network of computational nodes, and the step of compiling instructions to implement the network overlay graph can include assigning schedules of such instructions to individual programmable stream controllers.

DETAILED DESCRIPTION

Figure 1:
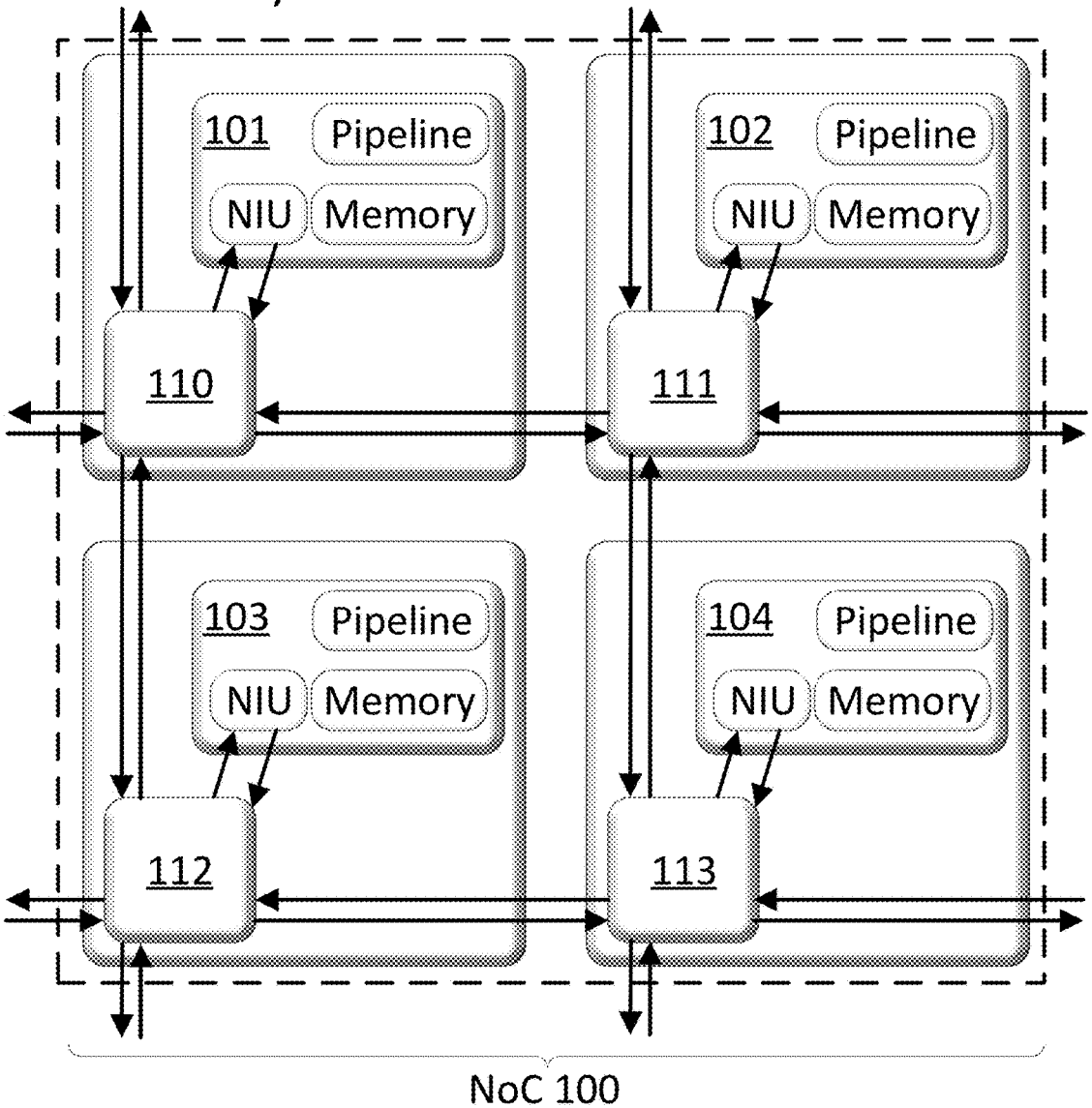
FIG. 1 includes both a block and layer diagram of a portion of a multi-core processor connected by a network-on-chip (NoC) in accordance with the related art.
Figure 1:
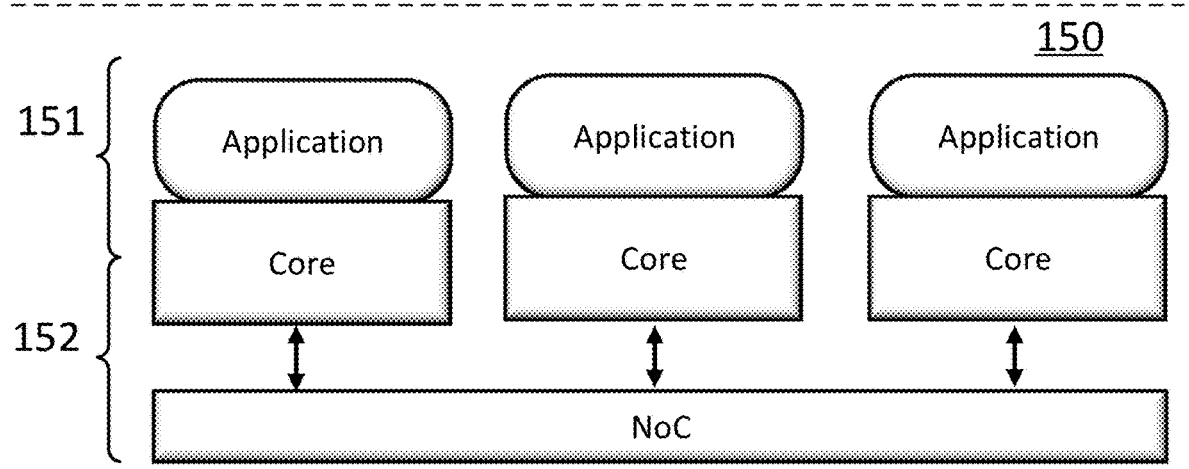

Methods and systems related to the field of data management for networks of computational nodes in accordance with the summary above are disclosed in detail herein. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Although the specific examples provided in this section are directed to a network of computational nodes in the form of a NoC connecting a set of processing cores, the approaches disclosed herein are broadly applicable to networks connecting any form of computational nodes. Furthermore, networks in accordance with this disclosure can be implemented on a single chip system, including wafer-scale single chip systems, in a multichip single package system, or in a multichip multipackage system in which the chips are commonly attached to a common substrate such as a printed circuit board (PCB), interposer, or silicon mesh. Networks in accordance with this disclosure can also include chips on multiple substrates linked together by a higher-level common substrate such as in the case of multiple PCBs each with a set of chips where the multiple PCBs are fixed to a common backplane. Networks in accordance with this disclosure can also be implemented in chiplet based systems. For example, in specific embodiments of the invention, one or more computational nodes could be housed or implemented by one or more chiplets, connected, for example, through an interposer.

Throughout this disclosure, the term "layer" is used in accordance with the standard usage of that term by those of ordinary skill in the art including usages with reference to the Open System Interconnection model (OSI) for telecommunications and networked computing systems generally. Specifically, the term "layer" refers to a system executing a set of instructions stored in memory or otherwise instantiated by hardware, including instructions instantiated in sequential logic and/or read only memory (ROM), that serve as a layer of abstraction for adjacent layers, via an interface, to thereby allow for the separation of concerns and facilitate interoperability. The layers can comprise the aforementioned instructions and an interface to at least one adjoining layer. Throughout this disclosure, a combination of layers that are capable of operative communication, including the interface or interfaces between those layers, will be referred to as a "stack."

In specific embodiments of the invention, the disclosed network of computational nodes is in the form of a set of processing cores in a multicore processor connected by a NoC. The processing cores can each include an NIU for interfacing with a router, a processing pipeline, and a memory. The memory could be a cache memory of the processing core such as a random-access volatile memory such as SRAM. The processing cores could also include additional or more specific elements such as a higher-level controller, serializer/de-serializer, nonvolatile memory for modifiable configuration information, and any number of arithmetic logic units and other fundamental computation units. The processing cores could also include one or more endpoints that can ultimately coordinate or execute operations within the core, such as a core controller. In specific embodiments, the core controller can be a dedicated Central Processing Unit (CPU). In either case, the core controller or CPU can administrate the transfer of data to a main processing pipeline of the processing core. The processing pipelines can be used to execute component computations required for the multicore processor to execute a complex computation. The NoC can include routers on each of the processing cores and a system of buses that either solely connect adjacent processing cores in the multicore processor for facilitating multi-hop communications or also connect distal processing cores for facilitating single-hop communications between those distal processing cores.

In specific embodiments of the invention, the disclosed network of computational nodes can include a network overlay layer. In embodiments in which the network is a NoC, the network overlay layer can be a NoC overlay layer. The network overlay layer can exhibit the features described in U.S. patent application Ser. No. 17/035,056 filed on Sep. 28, 2020, and U.S. patent application Ser. No. 16/942,492 filed on Jul. 29, 2020, both of which are incorporated by reference herein in their entirety for all purposes. The network overlay layer can logically isolate the computation layer of the network of computational nodes from the network layer of the network of computational nodes leaving the computational node free to focus on computation.

Figure 2:
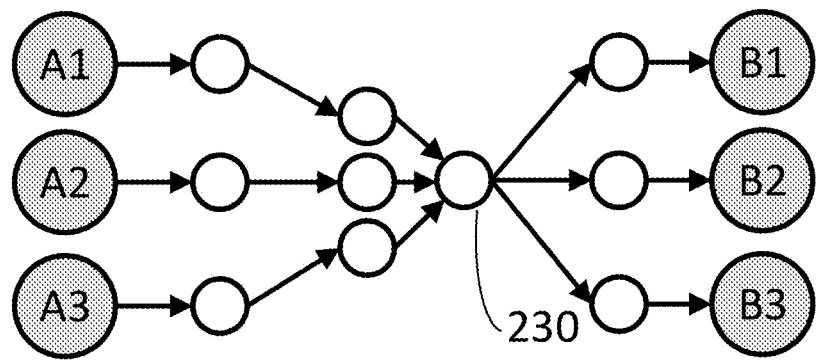
FIG. 2 includes a high-level block diagram to illustrate the compilation of a network overlay graph to execute an application data flow graph for a network of computational nodes, in accordance with specific embodiments of the invention disclosed herein.
Figure 3:
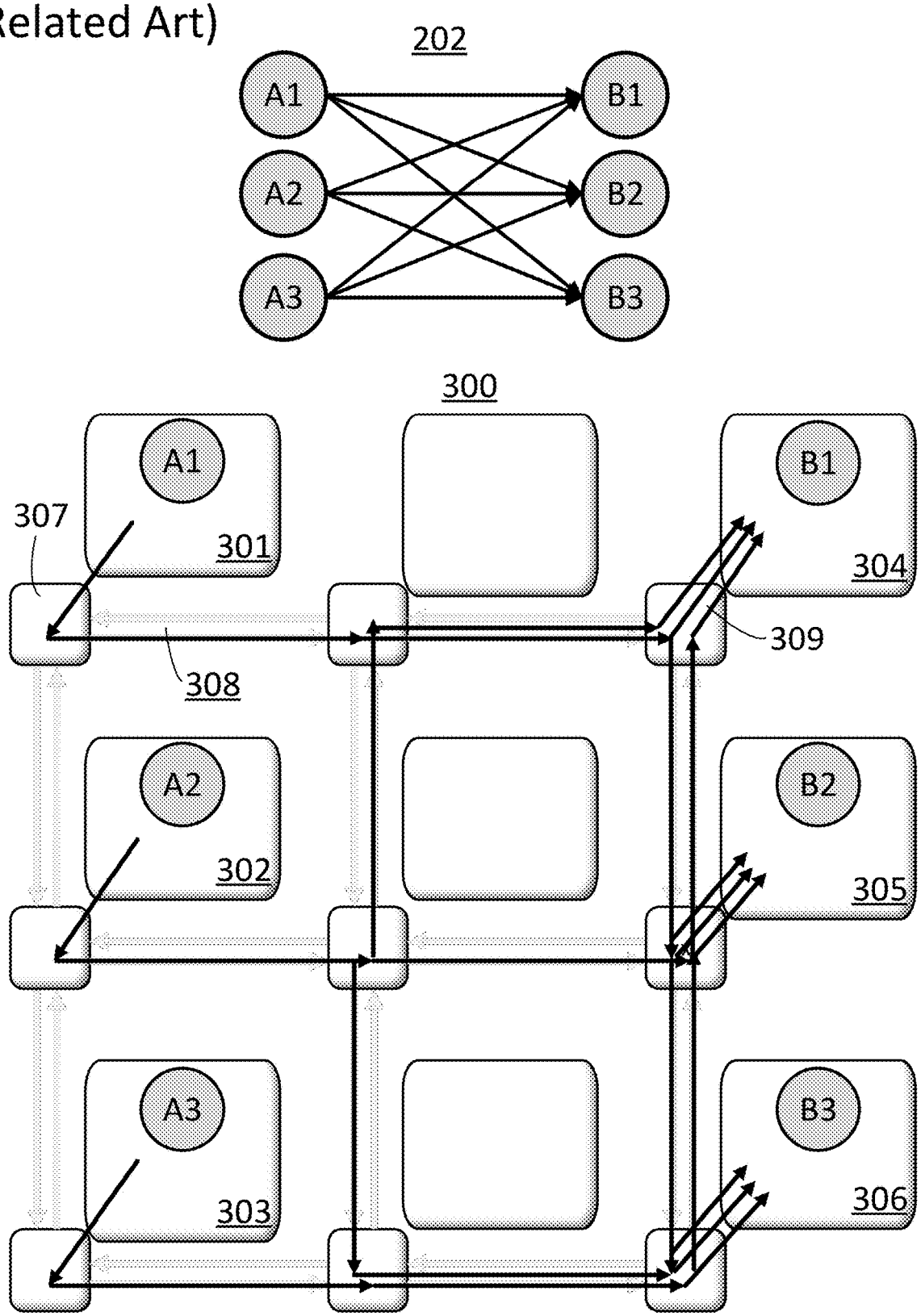
FIG. 3 includes an example of a network of computational nodes implementing an application data flow graph in accordance with the related art.
Figure 4:
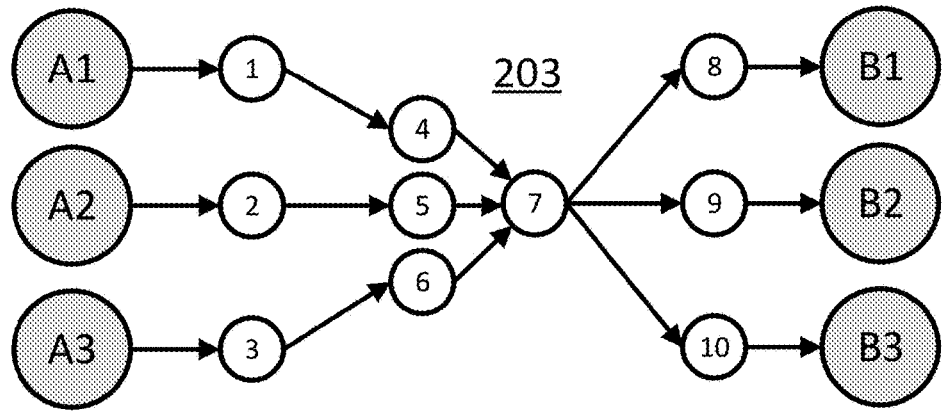
FIG. 4 includes an example of a network of computational nodes implementing a network overlay graph, in accordance with specific embodiments of the invention disclosed herein.
Figure 4:
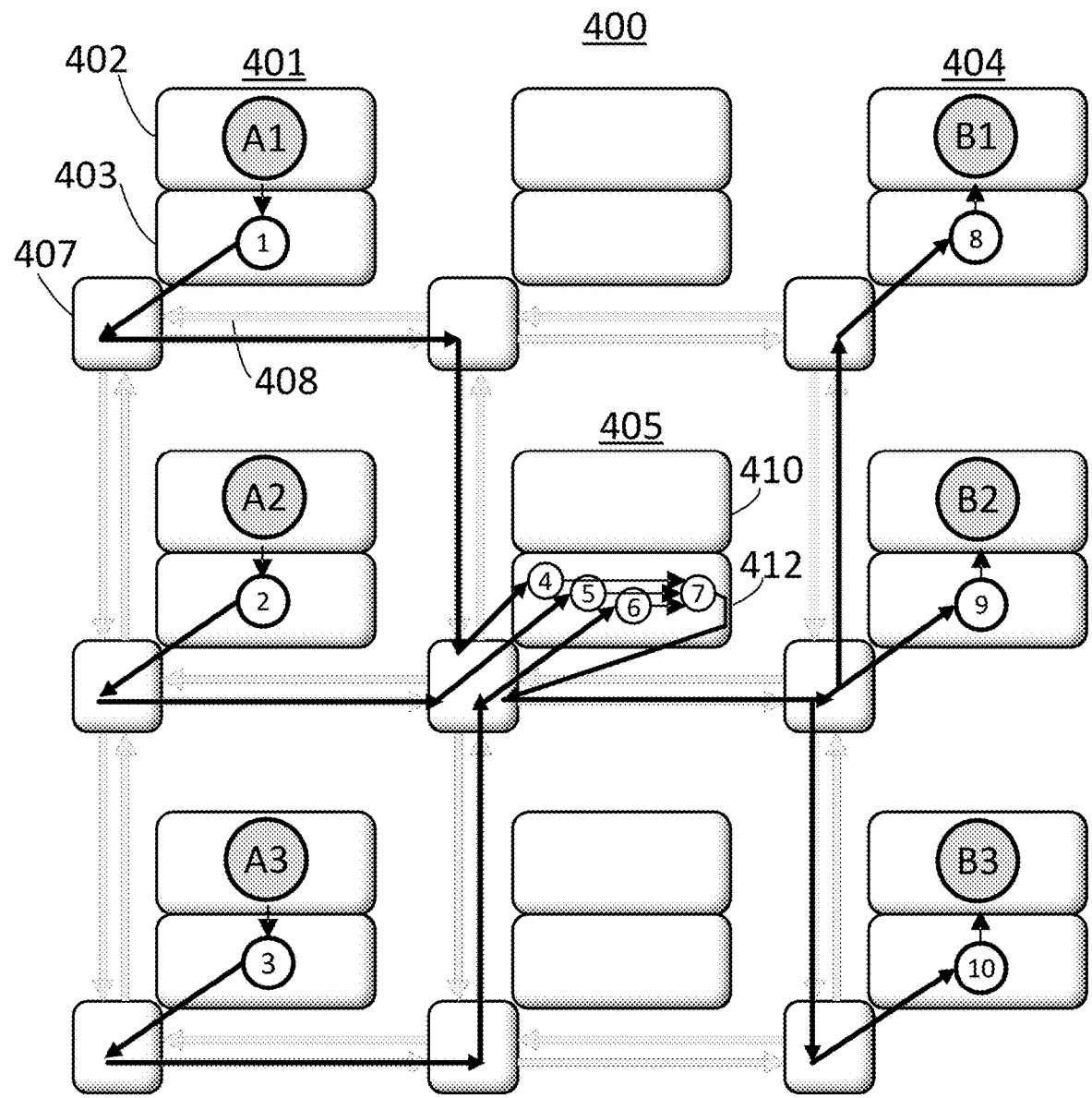

As mentioned in the summary, in specific embodiments of the invention, an application data flow graph can be efficiently executed through the compilation of a network overlay graph and the execution of the network overlay graph by a network overlay layer. FIGS. 2-4 can be referenced to explain how a network overlay graph can be compiled and assigned to computational nodes in the network where it will be executed by the network overlay layer on each of those computational nodes. In specific embodiments of the invention, the network overlay graph is compiled and assigned to computational nodes in the network in a manner that maximizes the replacement of unicasts of the same data by multicasts. In the specific example of a NoC and other interconnect fabrics, maximizing the use of multicast can lead to efficient utilization of the network. The overlay graph can also be generated to maximize the flow of data into each destination node on the graph (e.g., a node where the computation node will be provided with data). This will allow the destination nodes to compute in parallel and generate the data needed for the next set of destination nodes with minimal latency.

FIG. 2 is a high-level block diagram 200 to illustrate the compilation of a network overlay graph 203 to execute an application data flow graph 202 for a network of computational nodes. Block diagram 200 illustrates an example of an application code 201 that describes a portion of a complex computation to be executed by the network of computational nodes. In this example, the illustrated application code 201 includes "concatenate" functions for explicative purposes, but the application code is to be understood as the source code description of the complex computation, written for example in human-readable format and can include any definition, variables, functions, etc. to describe and allow for the execution of the complex computation. Step 210 represents the compilation of an application data flow graph 202 from the application code 201. Application data flow graph 202 can be compiled to execute the instructions in the application code 201. In the illustrated example, A1, A2, A3, B1, B2, and B3 represent nodes of the application data flow graph where the data is ultimately being produced (or injected into the graph) and/or consumed (or withdrawn from the graph). In the specific example of FIG. 2, A1, A2, and A3 are source nodes and B1, B2, and B3 are destination nodes, because data is flowing from A to B. The nodes can be associated with computational nodes of the network.

In embodiments where the computational nodes are cores in a multicore processor, the nodes of the application data flow graph can be associated with different cores. The association can be a product of the compilation process for a particular complex computation (e.g., node "A1" is associated with "core #5" because the data for node "A1" is physically stored on the memory of core #5). In this way, data from nodes A1 to B1 can be data produced by a source core associated with A1 to be consumed by a destination core associated with B1. In specific embodiments of the invention, the application data flow graph can be compiled for implementation within a single computational node and be related to local operations such as local transfers of data between different modules within the computational node. In those embodiments, the endpoints can be located within the same computational node.

Step 210 can be carried out by a compiler working in association with the computational nodes. The compiler can be a software module operating in association with the computational nodes. The compiler can include instructions to generate the application data flow graph. The instructions can be stored in memory or be dynamically generated by a higher-level controller. The physical location of the application data flow nodes, within the network, can be used as an input in the compilation of the application data flow graph 202. Additionally, the functions in the application code 201 can also be used to generate the graph. During the compilation of the application data flow graph 202, the application code 201 can be parsed so that a representation of the application code can be generated in the form of an application data flow graph. In other words, the application code can be "translated" from the application code language into a graph representation. This translation can occur as part of the process of translating a single complex computation described by application code 201 into a set of component computations which are then assigned to the various computational cores in a network. Accordingly, in the illustrated example there is a one-to-one correspondence between nodes of the application data flow graph and the variables and operands of the application code 201. However, this correspondence is not essential as the compilation of the component computations may break the original complex computation into finer grained pieces to enhance the computational performance of the system such as through increased parallelization (e.g., the variable "A1" could be associated with two separate nodes in the application data flow graph).

Step 220 represents the compilation of an overlay graph 203. As illustrated, the overlay graph 203 can be compiled from the application data flow graph 202. The compiler for the execution of step 220 can therefore take in as a given the interrelationship of the various nodes of application graph 202 and may also take into account which physical nodes in a computation network each of the nodes of the application graph were assigned to. The compilation process can take into consideration the goal of maximizing the replacement of unicasts of the same data by multicasts. For example, in the illustrated case, the number of multicasts can be set to one (with node 230 serving as the source of the multicast), while the compiler would not add another multicast because it would require an increase in the overall number of transmissions between nodes in the overlay graph. In specific embodiments of the invention, the overlay graph can be compiled directly from the application code 201, and it is not essential for the application graph to be formed as a distinct entity in memory prior to the execution of step 220 as one compiler may be able to execute the compilation processes necessary for both determining the required flow of data between nodes in the computational network and for generating the overlay graph. As explained with reference to application data flow graph 202, overlay graph 203 can be compiled to facilitate the execution of the instructions in the application code 201, and A1, A2, A3, B1, B2, and B3 represent the data that is ultimately being produced by the computation layer of the network or provided to the graph from the computation layer.

As illustrated, overlay graph 203 includes intermediate nodes that guide the data flow, that are neither present in application data flow graph 202 nor represented by variables or operands (or otherwise described) in application code 201. The intermediate nodes in overlay graph 203 can be assigned to computational nodes in the network of computational nodes, as will be explained below in more detail. The intermediate nodes can be physical nodes, such as a computational node in the network, or virtual nodes, implemented by the computational nodes. In this way, more than one intermediate node can be implemented by a single computational node. The computational nodes implementing the intermediate nodes in the overlay graph can be the same nodes associated with the nodes in the application data flow graph or overlay graph, can be different computational nodes, or a combination thereof. For example, in the previous example of a multicore processor where a source core, associated with A1, was transmitting data to a destination core, associated with B1, each of the source and destination cores could implement part, or all, of the intermediate nodes in the overlay graph along the path from A1 to B1, or one or more intermediate cores could implement all of the intermediate nodes in the overlay graph along the path from A1 to B1. As illustrated in application data flow graph 202, each source node in the application data flow graph associated with data A1, A2, and A3 multicast to each of three destination nodes in the application data flow graph associated with data B1, B2, and B3. In the overlay graph, the intermediate nodes can direct the data flow by, for example, grouping requests and then multicasting the combined data to other nodes. At the same time, the execution of the overlay graph takes place at an overlay layer level, and the computation layer does not have to deal with the transfer of data between intermediate nodes. The advantages of this approach can be understood with reference to FIGS. 3 and 4.

Step 220 can be carried out by a compiler working in association with the computational nodes. The compiler can be a software module instantiated by a higher-level controller. The physical location of the data associated with the nodes of the application data flow graph can be used as an input in the compilation of the overlay graph 203. Additionally, the functions in the application code 201 and/or edges of the application data flow graph 202 that define the data flow can also be used to generate the graph. During the compilation of the overlay graph 203, the application code 201 and/or application data flow graph 202 can be parsed so that a representation of the application code/application data flow graph can be generated in the form of an overlay graph. In other words, the application code/application data flow graph can be "translated" into an overlay graph representation.

The compiler may include instructions to generate the application data flow graph and define the intermediate nodes. The instructions can be stored in memory or be dynamically generated by a higher-level controller. The instructions can be updated for every application code/application data flow graph so that the application data flow graph is fully adaptative to the specific code it represents. Alternatively, or in combination, the instructions can be updated for every network of computational nodes so that the overlay graph is fully adaptative to the specific network of computational nodes it represents. For example, machine learning or artificial intelligence techniques can be used so that the compiler has knowledge to generate overlay graphs that consider behavioral patterns within a given network of computational nodes with regard to the functions in the application code. The compiler can also consider current traffic in the network, workload on specific computational nodes, potential for deadlocks or other failures, and multiple other factors to generate an overlay graph that optimizes the available resources. The compiler can also have instructions to adapt the overlay graph to certain conditions, for example, the number of computational nodes available in the network, or to favor a specific behavior, such as maximizing data transmission, prioritizing speed over processing workload, or reducing traffic in the network layer. In this way, the compiler can take into consideration multiple factors to generate the overlay graph and decide where to physically implement the intermediate nodes (i.e., which nodes of the computational network to associated with intermediate nodes in the overlay graph).

In specific embodiments of the invention, the intermediate nodes in the overlay graph can be implemented by streams. The edges in the overlay graph can be implemented by the flow of computation data through the overlay graph and between streams. The edges can represent the flow of computation data through the aforementioned streams. The streams can provide directivity to the flow of computation data but otherwise do not modify or process the data beyond assuring that data received at the input of the stream is passed on to the output of the streams. In specific embodiments of the invention, the interface of the overlay layer and the computation layer can also be implemented by streams. Accordingly, the set of streams that comprise the overlay graph can include a set of input streams and a set of output streams. In specific embodiments of the invention, the input streams are associated with source computational nodes, and the output streams are associated with destination computational nodes. In specific embodiments of the invention, the input streams are implemented by the source computational nodes, and the output streams are implemented by the destination computational nodes, in order to inject or consume data to and from the graph.

The streams can be virtual units and/or be mapped into physical units. For example, streams can map into hardware stream units such as PSCs. Any number of streams can map into a single PCS. In specific embodiments of the invention, the streams can be implemented using buffers, such as FIFO buffers of varying sizes. The streams can be used to allocate and coordinate resources in the network of computational nodes so that the data can flow through the network.

A schedule of instructions can be assigned to each PSC in the network of computational nodes so that the overlay graph can be executed. The schedule of instructions can be generated by the same or a different compiler than the one that generated the overlay graph, or can be generated under the instructions of a higher level controller. When the PSCs are assigned the instructions, the transitions of data in the overlay graph can be carried out via the instructions, and data can flow from one stream to another such as by following copy or streaming instructions, as will be explained below in more detail. In this way, data from the computation layer can be transitioned in the network layer via the execution of instructions at a network overlay layer level. Therefore, the computation layer can be isolated from the network layer tasks.

FIG. 3 and FIG. 4 will be described to explain the differences in the execution of an application data flow graph such as graph 202 and an overlay graph such as graph 203. FIG. 3 illustrates an example of a network of computational nodes 300 implementing an application data flow graph such as graph 202. In the example of FIG. 3, each node of the application data flow graph associated with data A1-B3 has been assigned to a computational node in the network. In this way, computational nodes 301, 302, and 303 can be referred to as source computational nodes, and computational nodes 304, 305, and 305 can be referred to as destination computational nodes.

Data produced and consumed by the computation layer can flow through the network 300 from the source computational nodes to the destination computational nodes via the network layer. For example, A1 can be produced by a processing pipeline and be multicast from computational node 301 for receipt by a processing pipeline in computational nodes 304, 305, and 306. The data can be sent using routers, such as router 307, and data buses, such as bus 308. In the same way, data can be received by the destination computational nodes from different source computational nodes. For example, computational node 304 can receive data from processing cores 301, 302, and 303. As illustrated, computational node 304 could process multiple transitions of data 309 from multiple sources. In specific scenarios, even if the data is ready at the source computational nodes at the same time, these transitions of data could need a series execution in order to manage the resources available in the network. The computation layer can coordinate the transitions of data and manage resources so that the application data flow graph 202 is executed and data flows through the network in the desired way.

In the illustrated examples, the computational nodes are cores of a multicore processor. Data can flow from a source core to a destination core via single hop transitions, in the case of adjacent cores, or multi-hop transitions, in the case of non-adjacent cores. When the source and destination cores are not adjacent to each other, as in the illustrated example, data can reach the destination core via the intermediate adjacent cores. The black arrows in network 300 illustrate an example of how the data represented by application data flow graph 202 could flow through network 300, but those skilled in the art can recognize that multiple other paths are possible in the illustrated network. As illustrated, numerous data paths are necessary in order for the application data flow graph 202 to be executed. This implementation can lead to issues such as deadlocks or unavailability of resources in the network when more than one core is attempting to establish a data path in the same network. Additionally, as explained before, a single source core or single destination core could be dealing with multiple data paths at the same time that could interfere with each other, and could require an execution in series and complex resource management in order to complete the execution of the graph. The above implementation would execute the computation as defined by application code 201 but could lead to a longer execution time and unnecessary resource allocation. Additionally, the computation layer would be involved in the coordination and management of the transfers of data through the network layer.

FIG. 4 illustrates an example of a network of computational nodes 400 implementing an overlay graph such as graph 203. As in the previous example, each overlay node associated with data A1-B3 has been assigned to a computational node in the network and the computational nodes are cores of a multicore processor. In the example of FIG. 4, however, the cores include an overlay layer able to implement the overlay graph, in accordance with specific embodiments of the invention. For illustrative purposes, the computation layer is represented by an upper box in the cores, such as box 402 in core 401, and the network overlay layer is represented by a lower box in the cores, such as box 403 in core 401. In network 400 illustrated in FIG. 4, the computation layer is isolated from the network layer by the overlay layer. For example, data A1 can be produced by a computation layer 402 in core 401. This data can flow through the network via routers, such as router 407, and data buses, such as bus 408. However, a network overlay layer 403 isolates the computation layer 402 from the network layer, and can implement the network overlay graph, as will be described below in more detail.

The overlay graph, such as graph 203, can be assigned to the computational nodes in various ways. The overlay graph can be assigned to the computational nodes by a higher-level controller working in association with the computational nodes. In a specific embodiment of the invention, the compiler described before will be also responsible for assigning the graph to the computational nodes and have instructions to assign the graph following certain criteria as described above for the compilation of the graph. A dedicated hardware and/or software module can be responsible for assigning the graph to the computational nodes, for example following instructions stored in memory or from a higher-level controller. The graph can be assigned in different ways depending on numerous factors such as the number of computational nodes in the network, the available resources, workload, network traffic, etc. The graph can be assigned in different ways to favor specific behaviors such as maximizing the amount of data being transferred simultaneously while reducing the overall dataflow in the network. In specific embodiments of the invention, the instructions for assigning the graph can include a discovery phase where the resources in network of computational nodes are analyzed, for example the number of available computational nodes is determined in order to decide where and how to implement the nodes of the graph. In specific embodiments of the invention, the discovery phase can be carried out before the overlay graph is compiled so that the compilation of the graph takes into consideration the architecture and resources in the network.

Assigning the overlay graph to the network of computational cores can also include mapping the streams or nodes in the graph into PSCs in the computational nodes. This step could take into consideration the total number of PSC in the network or the number of PCSs on a per computational node basis. This step can also include the configuration of the PSCs in the network. Once the overlay graph is generated and assigned to the network, the streams can be mapped into PSCs and the PCS can then be assigned a schedule of instructions for execution of the graph.

In the example of FIG. 4, the overlay graph has been assigned to network 400 in a way that the intermediate nodes of the overlay graph are distributed among the cores. In this example, some of the intermediate nodes have been assigned to the source and destination cores. For example, node 1 in overlay graph 203 has been assigned to source core 401 in network 400, and node 8 in overlay graph 203 has been assigned to destination core 404 in network 400. In specific embodiments of the invention, those nodes can be the input and output streams described above, being for example node 1 a node that "inputs" data from the computation layer to the graph or network, and node 8 a node that "outputs" data from the graph or network to the computation layer. In the illustrated example, an intermediate core 405 in the network is implementing the other intermediate nodes (4, 5, 6, and 7) in the overlay graph 203. For the sake of clarity and to differentiate this core or computational node from the intermediate nodes in the overlay graph, this core can be referred to as "intermediary core" or "intermediary computational node" in a general fashion.

The intermediary computational node in the network of computational nodes can implement one or more intermediate nodes in the overlay graph. The intermediary computational node can be a different computational node in the network at different times depending on the overlay graph and network conditions. In specific embodiments of the invention, the intermediary computational node can be a source computational node or a destination computational node and is not necessarily an intermediate computational node. In specific embodiments of the invention, more than one intermediary computational node can be operating in the same network at the same time. The intermediary node can have dedicated functions within the network such as receiving data from multiple source computational nodes and sending data to multiple destination computational nodes. In specific embodiments of the invention, the intermediary node performs operations on the data such that the data can be placed in condition for a determined type of transmission. For example, the intermediary node can combine data received from multiple source computational nodes and multicast the combined data to the destination computational nodes. As another example, the intermediary computational node can combine data received from multiple source computational nodes with data produced by the computation layer of the intermediary node itself, and multicast the combined data to multiple destination computational nodes.

Referring back to the example in FIG. 4, core 405 is the intermediary computational node in the execution of graph 203. The intermediary computational node 405 has been selected such that it is the middle core in the architecture of network 400. However, this is not a limitation of the present invention. As mentioned before, the intermediary computational node can be any computational node in the network regardless of their physical position, and can be, for example, any source or destination core. In a similar fashion, the source and destination cores in the examples of FIG. 3 and FIG. 4 are shown evenly distributed in the network and around the intermediary node for the ease of the explanation only, this is not a limitation of the present invention, and the source and destination nodes can be any node in the network regardless of their physical position and their position with regard to the intermediary node.

In FIG. 4, intermediary computational core 405 receives data from the source cores, through the implementation of the intermediate nodes 4, 5, and 6 of graph 203, combines the data through the implementation of intermediate node 7, and multicasts such data to the destination cores. As illustrated, four nodes of the overlay graph are implemented in the intermediary core in this example. As in FIG. 3, the black arrows represent the flow of data through the network. By comparing this implementation with the one in FIG. 4, it is evident that, although the number of nodes in the overlay graph 203 increased with regard to the number of nodes in the application data flow graph 202, the number of black arrows, representing the actual transfer of data in the network, decreased in the implementation of network 400 with regard to network 300. The intermediary computational node can combine data and multicast to multiple destination computational nodes that would otherwise receive individual transitions of data from individual source computational nodes. This implementation can maximize multicasts while minimizing the overall number of transitions of data through the network. In this way, overloading of the network layer is also prevented by managing part of the transfers of data at an overlay layer level.

The benefits associated with a network overlay graph as described with reference to FIGS. 3 and 4 stem at least partially from the benefits of collecting data from multiple source computation nodes in the network overlay layer at an intermediary node, combining the data in the network overlay layer, and transmitting the combined data in a multicast to multiple destination nodes. In specific embodiments, the multiple source computational nodes can be the intermediary node (i.e., the computation layer of the intermediary node can provide computation data directly to the network overlay layer to be combined with computation data from separate source nodes).

In specific embodiments of the invention, the combined data is combined on the intermediary node completely transparently to the computation layer. For example, the combination could be executed by one or more PCSs executing network overlay layer instructions according to a preloaded schedule that does not need to be administrated by the computation layer. In the example of FIG. 4, for example, where the computational nodes include a network overlay layer, the intermediary node 405 is able to receive and combine the data from the different source computational nodes at a network overlay 412 level. The computation layer 410 of the intermediary node or the network generally is not necessarily involved in the receiving, combining, and sending the data. In a similar fashion, the source and/or destination nodes can implement the nodes of the overlay graph at a network overlay layer level. For example, source computational node 401 can provide A1 from the computation layer to the network overlay layer via a first node in the overlay graph. This step can be understood as the injection of data into the graph. The transition of the data can then be performed by the overlay layer while the computation layer can continue to work on computation layer tasks.

In specific embodiments, the intermediary node is not represented by a node on the application data flow graph but is represented on the network overlay graph, as represented in the examples of FIG. 2-4. This may seem counterintuitive, but given how the network layer of an interconnect fabric actually implements an edge of an application data flow graph, adding additional nodes to the graph actually decreases the total number of physical transfers of data through the interconnect fabric.

Figure 5:
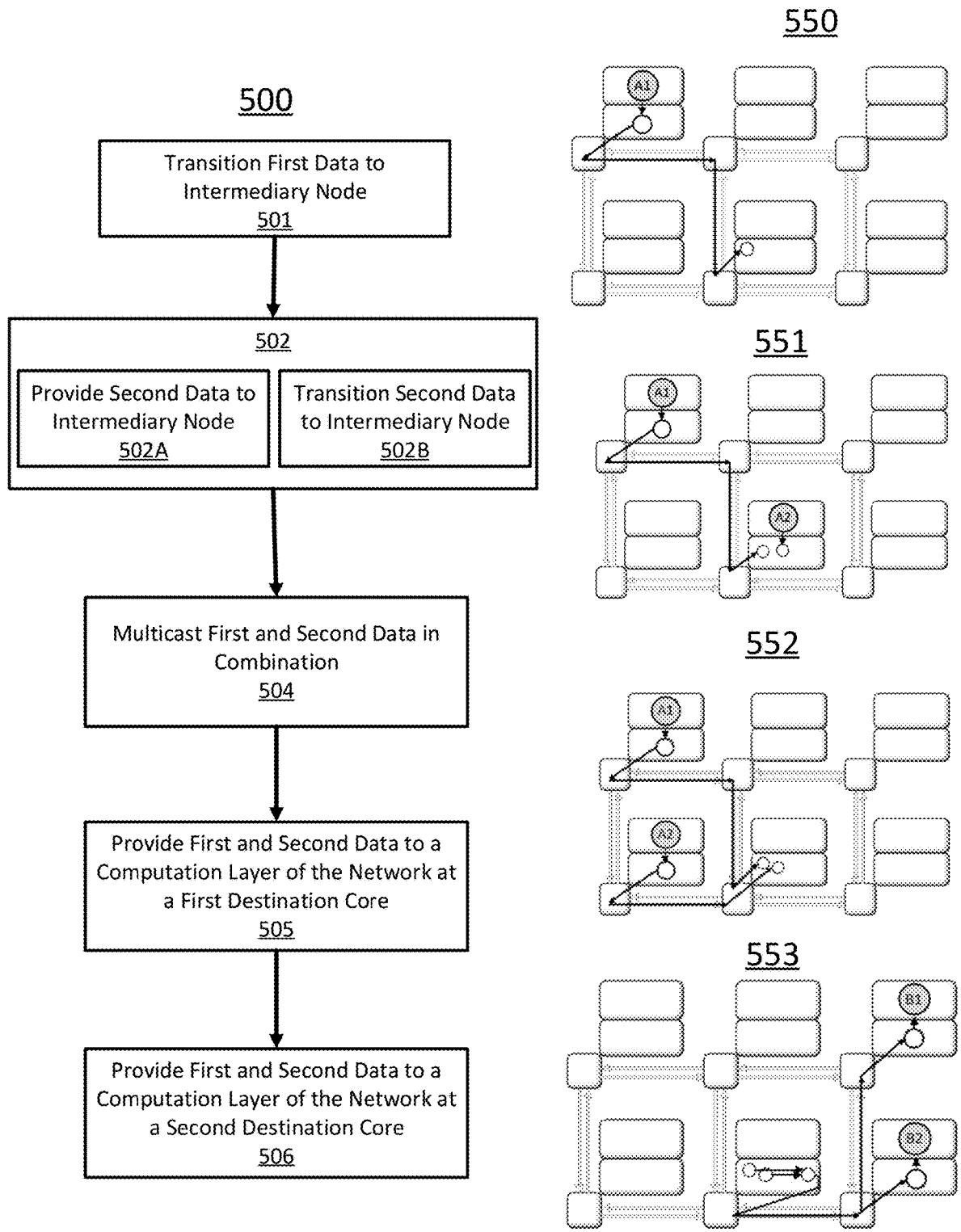
FIG. 5 includes a flow chart for a set of methods for executing an application data flow graph, in accordance with specific embodiments of the invention disclosed herein.

FIG. 5 illustrates a flow chart 500 for a set of methods for executing an application data flow graph. Flow chart 500 starts with step 501 of transitioning a first application data from a first source computational node to an intermediary node. The first application data can be provided from any of the computational nodes. This step is illustrated in block diagram 550, where A1 is being transitioned from a source core to an intermediary core. Flow chart 500 continues with step 502, which includes a step 502A of providing second application data from a computation layer of the network of computational nodes to a network layer of the network of computational nodes on the intermediary computational node. The second application data can be data provided by the computation layer of the intermediary node, such as by a controller or processing pipeline. Step 502A is illustrated in block diagram 551, where A2 is being provided from the computation layer on the intermediary core itself. Step 502 also includes a step 502B of transitioning second application data from a second source computational node to the intermediary computational node. Step 502B is illustrated in block diagram 552 where A2 is being transitioned from a second source core to the intermediary core. Step 502A and 502B represent alternative steps to provide the second application data to the intermediary node. In the case of step 502A, the second data is provided by the intermediary node itself. In the case of step 502B, the second application data is provided by a second source computational node. Since the intermediary computational node can be any node in the network, in specific embodiment of the invention step 502A can be understood as an instance of step 502B where the second source computational node is the intermediary node itself. The intermediary node could also be the first source computational node and provide the first application data instead. Steps 502A and 502B represent examples of how application data from different sources can be provided to the intermediary node, but do not limit the scope of the present invention. Multiple combinations are possible. For example, the computation layer of the intermediary node could provide both the first and the second application data.

Regardless of how the first and second application data are provided to the intermediary node, flow chart 500 continues with a step 504 of multicasting the first application data in combination with the second application data from the intermediary computational node to at least two destination computational nodes. As a result of the multicasting step, the first and second data are provided to the computation layer at a first and second destination node in steps 505 and 506, where the first and second data was originally and individually directed to. Steps 504, 505, and 506 are illustrated in block diagram 553. As illustrated in the diagrams, the first source computational node, the second source computational node, the intermediary computational node, and the at least two destination computational nodes can all be in the same network of computational nodes. First and second application data and first and second source and destination nodes are used here for explicative purposes only. More than two source nodes, application data and destination nodes, can be involved and the methods would be carried out in a similar manner.

The first and second application data can be combined in multiple ways so that the resulting transition comprises both first and second data. In any case, the combined data can be treated as a single block of data for a subsequent transition in the network. For example, data from the first source core can be stored at a first buffer or address in memory. Data from the second source core can be stored at a second buffer or address in memory. The combined data could include data from both buffers or addresses in memory and be treated as a single block of data even though they were not associated to the same physical address. In specific embodiments of the invention, combining the application data can include combining data from a first physical address and a second physical address into a third physical address. The data can be stored in the third physical address consecutively or interleaved. In specific embodiments of the invention, combining the application data can include creating a variable or a virtual reference that references the different application data in combination. In specific embodiments of the invention, combining the application data can include creating a function or instruction that calls the combination of data from different sources, such as a "merge" function that can be given as an instruction to a PSC for execution of the overlay graph.

As mentioned in the summary, in specific embodiments of the invention, an application data flow graph can be efficiently executed through the generation of instructions to implement a network overlay graph. The instruction can be executed by a network overlay layer. The network overlay graph can be generated in accordance with the approaches described above with reference to FIGS. 2-4. In specific embodiments of the invention, the network overlay layer is distributed across the network of computational nodes, and the step of compiling instructions to implement the network overlay graph can include assigning schedules of such instructions to be executed by the network overlay layer on those computational nodes.

In specific embodiments, the nodes of the network overlay graph can be implemented as virtual streams which map onto PCSs on each of the computational nodes. The streams can be sequences of instructions for the network overlay layer which are assigned to specific PCSs. The PCSs can comply with those disclosed in U.S. patent application Ser. No. 17/035,056 filed on Sep. 28, 2020. Multiple virtual streams can be mapped onto each PCS. Each PCS can be given a schedule of instruction that execute the virtual streams. Each PCS can execute its assigned virtual stream instructions in order, and the schedule can also contain control instructions such as branching (e.g., execute branch 1 if data "1" is received from upstream) and gathering instructions (e.g., multicast data "1" with data "2" after data 1 and 2 are received). The streams can be interpreted as a buffer of data that needs to be transmitted through the network overlay graph from one node to another. The buffer can include a number of network packets (i.e., the data needs to be broken into pieces "packetized" to be transmitted through the network layer).

The generation of the instructions, and the assignment of the instructions to specific computational nodes can be conducted with several goals in mind including overlapping computation by the computation layer and communication by the network layer, maximizing concurrence of sending and receiving operations within the network overlay layer, and preventing over-use of concurrence from overwhelming the resources of the network layer. For example, if all of the streams of the overlay graph in FIG. 4 were designed to be executed simultaneously by 10 PCSs, the goals of optimizing the implementation of the network overlay layer would be met, but the network layer might be overwhelmed by the large number of simultaneous requests for transfers of packets through the network. In embodiments in which the PCSs are hardware units, the generation of the instructions for the network overlay layer can also be constrained by the number of available hardware resources in total and the number of PCSs per computation node.

Virtual streams, or other nodes of the network overlay graph, can be assigned to specific computational nodes during the compilation process in various ways. At least one virtual stream can be utilized where each input or output to the computation layer occurs, which is taken as a given when the instructions are compiled and virtual streams are assigned. The number of local copies can also be minimized as redundant copies on the same physical node can be eliminated. With those two constraints in place, the compiler can maximize the use of streaming given a maximum pre-specified limit of concurrency per computation node. The concurrency limit can also be set by a combination of these factors such as five maximum PCSs per computation node and 25 maximum PCSs implementing virtual streams simultaneously across all computation nodes in the network. This can be set by the number of PSCs that are available on a computation node or limitations placed on the number of PCSs that are allowed to be implemented in the network overall based on bandwidth constraints of the network. A copy mechanism can then be used to implement additional virtual streams. Once the virtual streams have been assigned to cores, low level instructions can be compiled to implement the virtual streams on PCSs. This step can include merging local copies and inserting instructions to maintain dependencies as will be described below.

In specific embodiments of the invention, local copies in a network overlay graph can be merged so that a single transition of data includes merged data that otherwise would require two or more independent transitions before it is sent to its destination. In this way, remote copies can be optimized by minimizing the number of local copies before the data is sent to a different computational node. In specific embodiments of the invention, merging local copies will allow for the elimination of redundant copies and optimization of the resources in the network of computational nodes. PSCs in the computational nodes can manage the merge of local copies, for example by copying the merged data into a single stream that can then be copied remotely to a different computational node.

In specific embodiments of the invention, local and remote synchronization of the execution of a network overlay graph can be maintained by the use of instructions that can allow for either explicit or implicit synchronization. For example, explicit local synchronization can be achieved by inserting tokens for communication within the computational nodes. Tokens can be sent between different PSCs, the computational layer and the PSCs, etc. Tokens can indicate when data is ready or needed in the computation layer, when a PSC is ready for subsequent processing, when the entities are ready to send or receive data, or any other necessary communication. Tokens can also be interrupts from the computation layer, notification of events from the network layer, or direct messages at a network overlay level. Implicit remote synchronization can be achieved via instructions such as "remote copy" in a copy mechanism or "push" instructions in a streaming mechanism, as will be described in the examples below in more detail. In any case, dependencies are maintained throughout the execution of the graph. Each of the PSCs can be programmed to obey the dependencies and maintain synchronization, in order to execute the instructions in a logical order so that the data can flow in accordance with the overlay graph.

In specific embodiments of the invention, transitions of data that implement nodes of the overlay graph can be conducted through network layer operations such as memory copy operations or streaming operations. The copy operation can include copying data from one node to the other in a single or fixed number of operations that can depend on, for example, the size of the data to be transferred. For example, if the streams were implemented by buffers or memory spaces in the computational nodes, the copy operation could include copying the complete content from one buffer to another. Resources can be allocated in the network for a given copy operation and deallocated once the copy is completed. The streaming operation can include a constant flow of data from one node to another. Therefore, in specific embodiments of the invention, resources allocated for streaming will not be deallocated after a single transition of data and can remain available until the streaming operation is no longer in use. Data to be transferred via streaming operation does not need to be complete for the transfer to take place. In this way, data from the computation layer being produced in one computational node can be streamed as it is being produced even though the data is not completely available. Examples of how both copy and streaming mechanisms can be implemented by PCSs in a network overlay layer will be given with reference to FIG. 6-9.

Different resources may be necessary for an efficient implementation of either copy or streaming operations. In the case of the copy operation, source nodes that only send data can implement a single PSC. In a similar way, destination nodes that only receive data can implement a single PSC. The intermediary computational nodes that both receive and send data can also implement a single PSC for achieving serial operation. However, performance can be improved by the use of two or more PSCs on the intermediary computational node, as will be explained with reference to the examples in FIG. 6-9. In the case of streaming operations, source and destination nodes can likewise each implement a single PSC. However, the intermediary computational node may need to implement a PSC for each source node in order to maintain resources for streaming. In this way, the number of PSCs can scale with the number of source nodes. Alternatively, to avoid the need for a PSC per source endpoint, multiple streams can be implemented by the intermediary computational node with dedicated instructions to use data from the different source nodes. For example, virtual streams implementing a "merge" sequence can go through the source nodes in a sequence of instructions similar to the copy operation.

Figure 6:
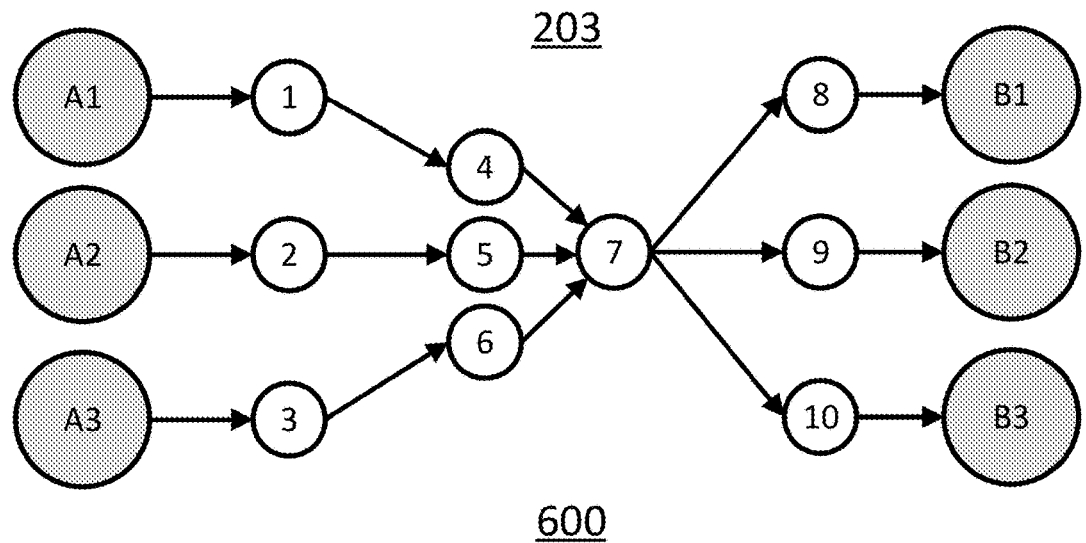
FIG. 6 includes an example of a copy-based execution of a network overlay graph in a single computational node with three programmable stream controllers (PSCs), in accordance with specific embodiments of the invention disclosed herein.
Figure 6:
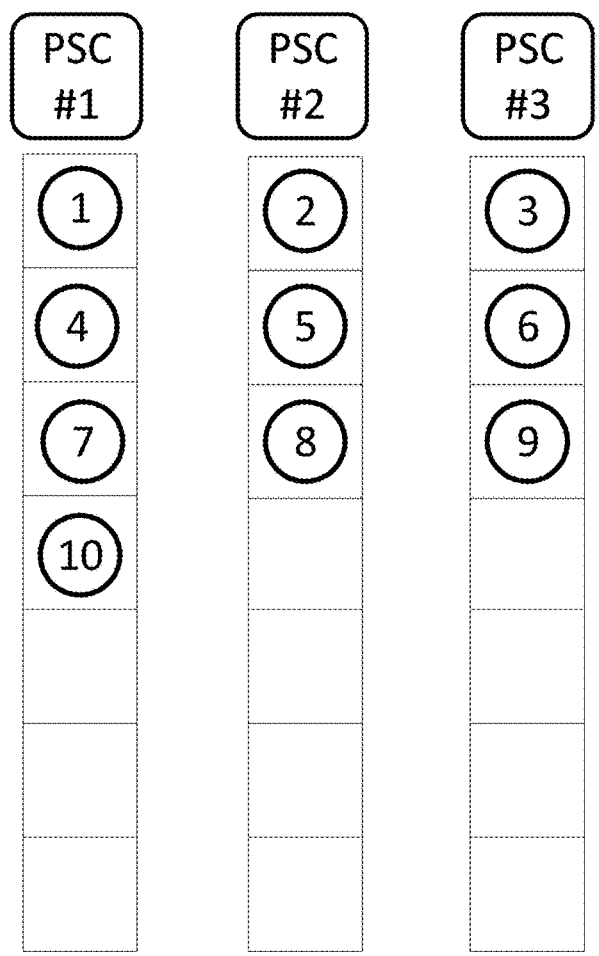

FIG. 6 illustrates an example of a copy-based execution of a network overlay graph in a single computational node with three PSCs. The overlay graph can be graph 203 of FIG. 2. In the example of FIG. 6, the streams or nodes of the overlay graph have been numbered so that it is possible to identify the streams. In specific embodiments of the invention, the streams can be virtual streams (VS). In specific embodiments of the invention, each virtual stream can be interpreted as a variable or a buffer containing or representing data, for example, a number of packets. In those embodiments, the stream numbers can be a buffer or variable identifier.

FIG. 6 illustrates diagram 600 of three PSCs (PSC #1, PSC #2, and PSC #3) operating in a single computational node. As illustrated, multiple streams or nodes of the overlay graph 203 are mapped onto the different PSCs. As explained before, a low-level instruction schedule can be assigned for the PSCs to execute the graph. An example of a schedule of instructions for the PCSs of FIG. 6 is provided in Table 1 below.

TABLE 1

Memory copy-Single Core-Schedule of instructions

| Time step | PSC #1 | PSC #2 | PSC #3 |
|---|---|---|---|
| 0 | receive_token from processing pipeline | receive_token from processing pipeline | receive_token from processing pipeline |
| 1 | copy A1 to VS1 | copy A2 to VS2 | copy A3 to VS3 |
| 2 | copy VS1 to VS4 | copy VS2 to VS5 | copy VS3 to VS |
| 3 | gather_receive_tokens from {PSC #2, PSC #3} (gather multiple tokens) | send_token to PSC #1 | send_token to PSC #2 |
| 4 | copy {VS4, VS5, VS6} into VS7 | | |
| 5 | multicast_send_token to {PSC #2, PSC #3} | receive_token from PSC #1 | receive_token from PSC #1 |
| 6 | copy VS7 to VS10 | copy VS7 to VS8 | copy VS7 to VS9 |

As illustrated in the table above, the instructions for the PSCs can include simply waiting until a token from a processing pipeline is received. For example, a token can be used to indicate that data is ready for transition or necessary somewhere else in the network. In the example of FIG. 6, the instructions for the PSCs can include "copy" instructions to execute the necessary copies from one stream to another. The copy instructions can specify the nodes or streams where data is to be copied from/to. As illustrated in diagram 600, in a first time step, data A1 can be copied to stream (1) by PSC #1, data A2 can be copied to stream (2) by PSC #2, and data A3 can be copied to stream (3) by PSC #3. In a second time step, data from stream (1) can be copied to stream (4) by PSC #1, data from stream (2) can be copied to stream (5) by PSC #2, and data from stream (3) can be copied to stream (6) by PSC #3. In a subsequent time step, PSC #1 can have instructions to gather multiple tokens, for example tokens received from PSC #2 and PSC #3. In the same time step, PSC #2 and PSC #3 in turn can have instructions to send the tokens to PSC #1. The tokens can indicate that data is ready, that data is needed, that the streams are ready to receive the data, or otherwise facilitate communication between the different elements of the computational nodes, or between different computational nodes. In a subsequent time step, PSC #1 can have instructions to copy the content of streams (4), (5), and (6) into stream (7). In this way, data A1-A3 is ultimately combined by PSC #1. In a subsequent time step PSC #1 can have instructions to multicast to the other PSCs. For example, a multicast send token can be sent to PSC #2 and PSC #3. In the same time step, PSC #2 and PSC #3 can have instructions to wait to receive the token from PSC #1. The token can be used to notify the PSCs that data is ready. In a subsequent time slot, PSC #1 can have instructions to copy the content of stream (7) into stream (10), PSC #2 can have instructions to copy stream (7) into stream (8), and PSC #3 can have instructions to copy stream (7) into stream (9). In this way, data can be delivered to the destination nodes associated with data B1-B3.

By the execution of low-level instructions, the PSCs are then able to direct the flow of the data through the different streams or nodes of the overlay graph. The schedule of instructions can be compiled by a module working in association with the computational nodes and assigned to the computational nodes or PSCs within the computational nodes.

Figure 7:
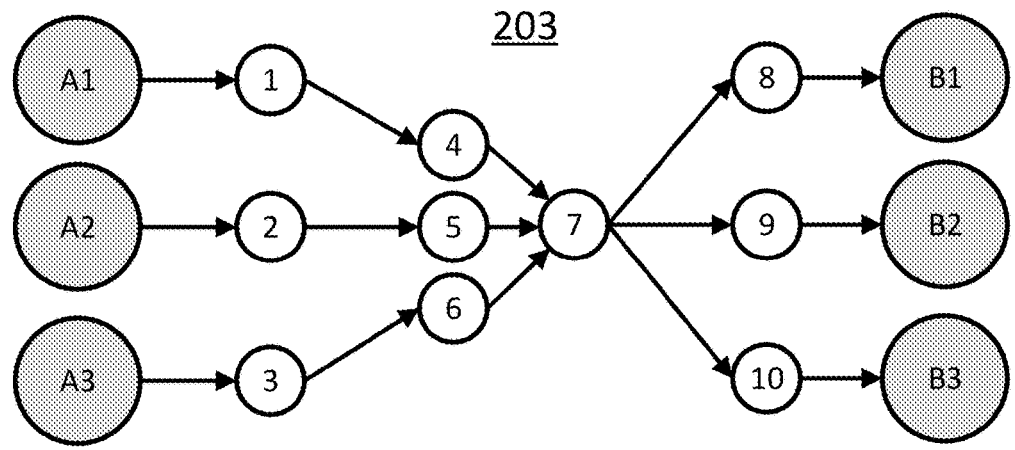
FIG. 7 includes an example of a copy-based execution of a network overlay graph by multiple computational nodes, each including a PSC, in accordance with specific embodiments of the invention disclosed herein.
Figure 7:
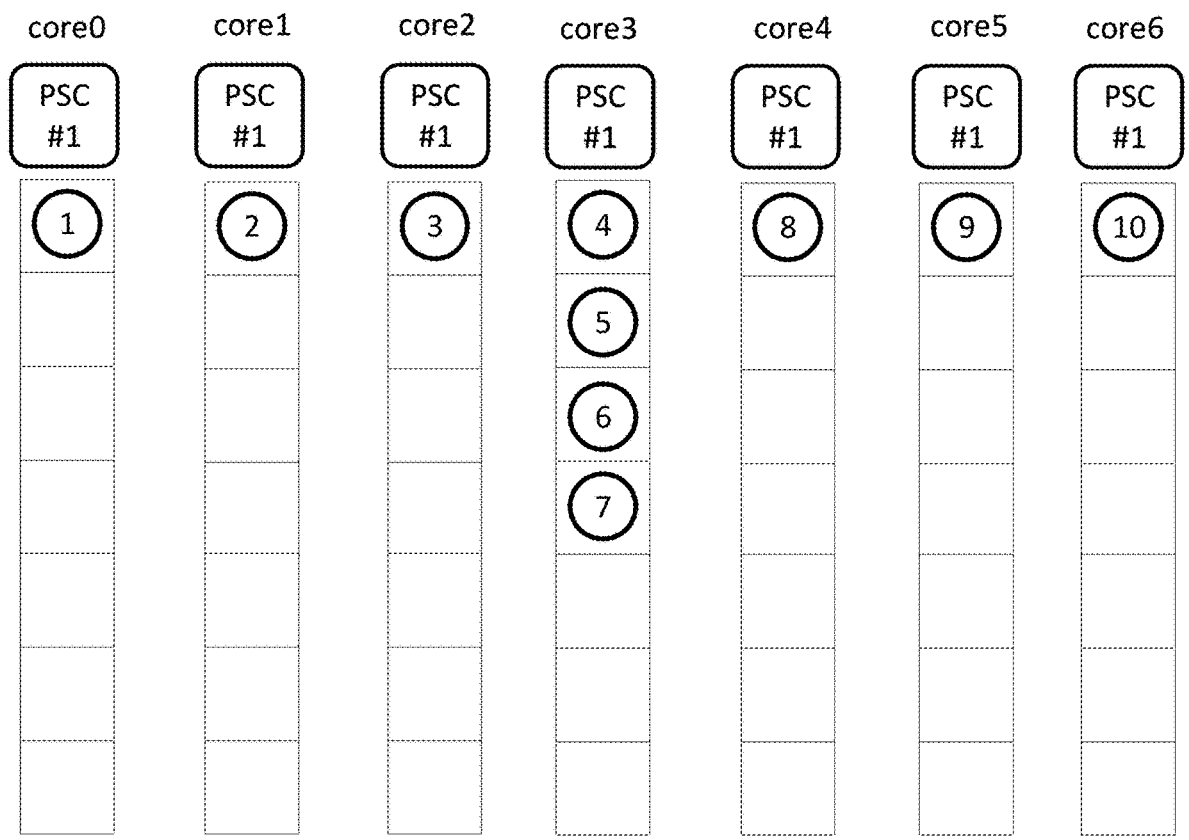

FIG. 7 illustrates an example of a copy-based execution of a network overlay graph by multiple computational nodes each including a PSC. FIG. 7 illustrates diagram 700 of multiple computational nodes each including a PSC. In the example of FIG. 7, the computational nodes are cores in a multi-core processor. As illustrated, multiple streams or nodes of the overlay graph 203 are mapped onto the different PSCs in the different cores. As explained before, a low-level instruction schedule can be assigned for the PSCs/cores to execute the graph. An example of a schedule of instructions for the PSCs of FIG. 7 is provided in Table 2 below.

TABLE 2

Memory copy-Multi Core-Schedule of instructions

| | Core 0 PSC #1 | Core 1 PSC #1 | Core 2 PSC #1 | Core 3 PSC #1 | Core 4 PSC #1 | Core 5 PSC #1 | Core 6 PSC #2 |
|---|---|---|---|---|---|---|---|
| 0 | receive_token (A1 from processing pipeline) | receive_token (A2 from processing pipeline) | receive_token (A3 from processing pipeline) | | | | |
| 1 | Copy (A1 to VS1) | Copy (A2 to VS2) | Copy (A3 to VS3) | | | | |
| 2 | remote_copy (send, VS1, to {VS4, core 3}) | | | remote_copy (receive, VS1, from {VS4, core 0}) | | | |
| 3 | | remote_copy (send, VS2, to {VS5, core 3}) | | remote_copy (receive, VS2, from {VS5, core 1}) | | | |
| 4 | | | remote_copy (send, VS3, to {VS6, core 3}) | remote_copy (receive, VS3, from {VS6, core 2}) | | | |

TABLE 2-continued

Memory copy-Multi Core-Schedule of instructions

| | Core 0 PSC #1 | Core 1 PSC #1 | Core 2 PSC #1 | Core 3 PSC #1 | Core 4 PSC #1 | Core 5 PSC #1 | Core 6 PSC #2 |
|---|---|---|---|---|---|---|---|
| 5 | | | | remote_copy (send_multicast, merge{VS4, VS5, VS6} as VS7, to {{VS8, core 4}, {VS9, core 5}, {VS10, core 6}}) | remote_copy (recieve, VS8, from {VS7, core 3}) | remote_copy (recieve, VS9, from {VS7, core 3}) | remote_copy (recieve, VS10, from {VS7, core 3}) |
| 6 | | | | | send_token (B 1 as VS8, to processing pipeline) | send_token (B 2 as VS9, to processing pipeline) | send_token (B 3 as VS10, to processing pipeline) |

As in the previous example, the instructions can include send or receive tokens, copy from one stream to another, etc. The example of a multicore processor in FIG. 7 can include additional instructions not disclosed with reference to the single computational node in FIG. 6. For example, remote copies may now be necessary to send data from one core to another. In this way, local copies, as in the example of FIG. 6, can be performed to copy data A1 to stream (1), A2 to stream (2), and A3 to stream (3). Additionally, remote copies can be performed to send stream (1) to stream (4) in core 3, stream (3) to stream (5) also in core 3, and stream (3) to stream (6) also in core 3. In this way, instructions for local copies and remote copies can be part of the low-level instructions schedule in the example of a multicore processor or multiple computational nodes where the PSC are implemented by different computational nodes. Once all the data is received by core 3, core 3 can have instructions to merge streams (4), (5), and (6) into stream (7). In this way, data from multiple sources can be combined before it is forwarded to the destination. Core 3 can also have instructions to send, via a remote copy instruction for example, the merged data to the destination cores. In this way, stream (7) can be copied to stream (8) in core 4, stream (9) in core 5, and stream (10) in core 6. The destination cores can then send a token to the processing pipelines. For example, core 4 can send a token indicting that B1 is associated to stream (8). The processing pipeline can locate the data for example by referring to a location in memory associated with stream (8).

Figure 8A:
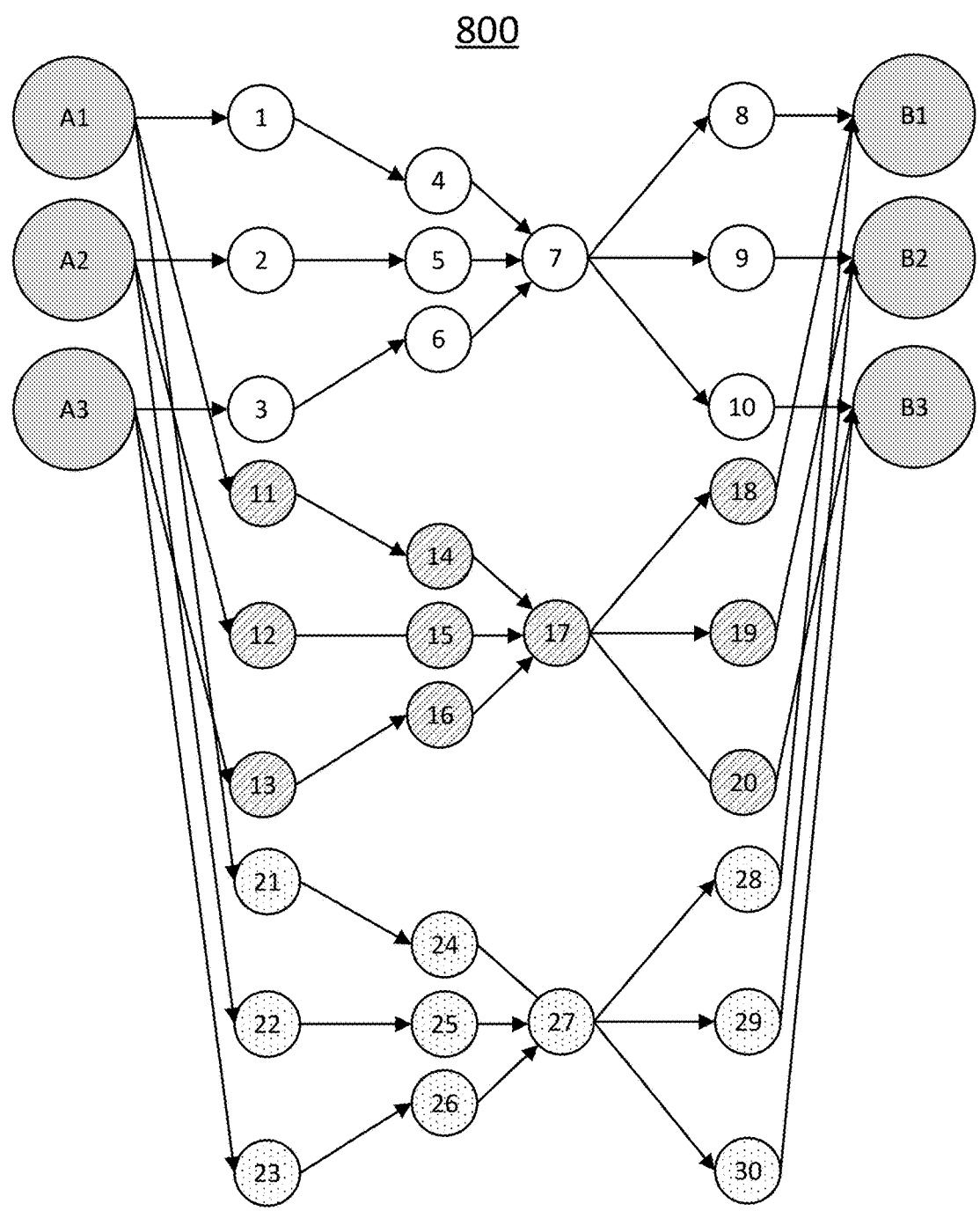
FIG. 8A includes an example of three consecutive instances of a network overlay graph, in accordance with specific embodiments of the invention disclosed herein.
Figure 8B:
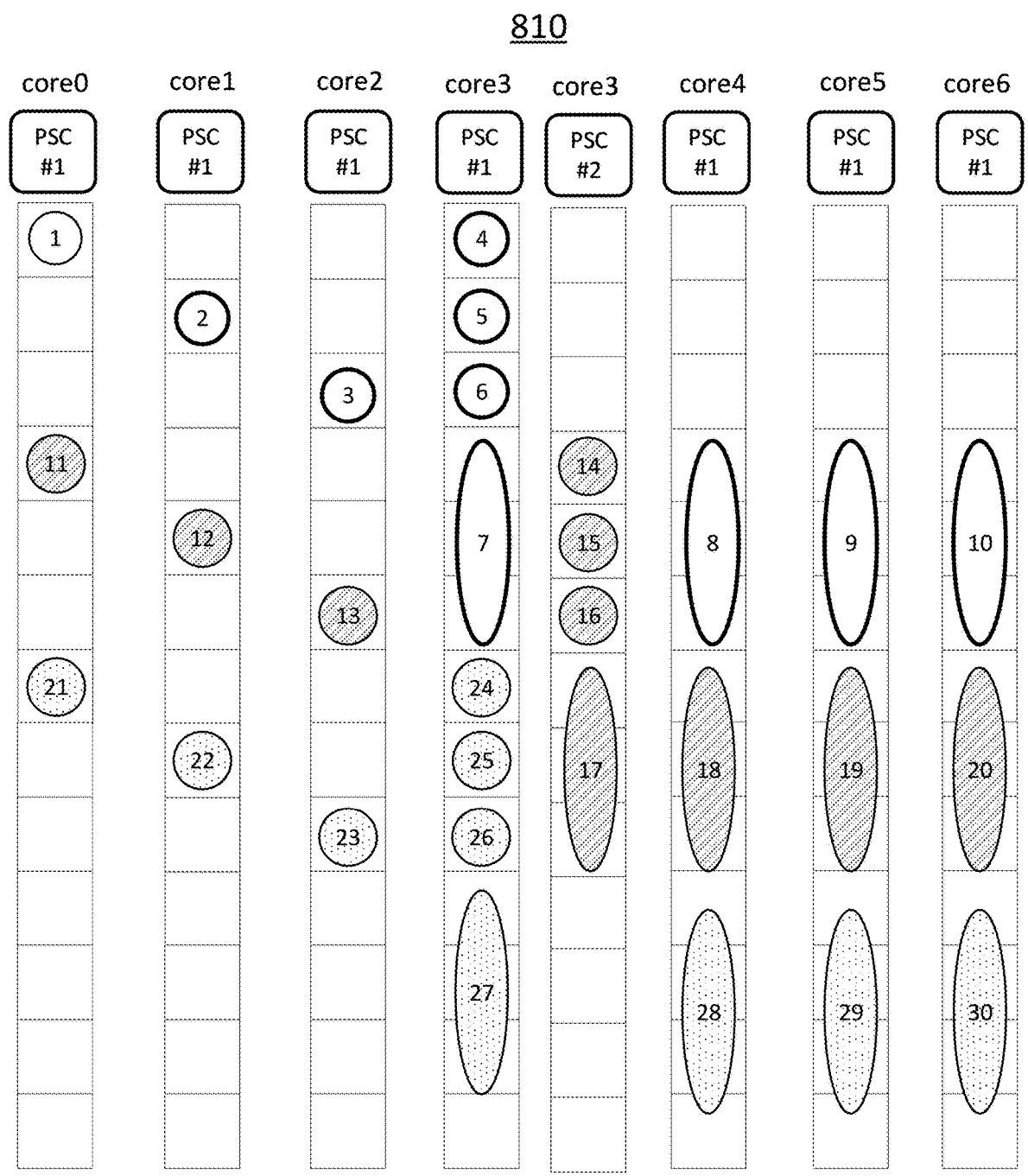
FIG. 8B includes an example of a copy-based execution of a network overlay graph by multiple computational nodes with two PSCs in the intermediary computational node to implement double-buffering, in accordance with specific embodiments of the invention disclosed herein.

In specific embodiments of the invention, improved performance and further concurrency can be achieved by having more than one PSC in the intermediary core. For example, a second PSC on core 3 in the previous example could be provided to receive the next set of buffers from cores 0, 1, and 2 while PSC #1 is sending the initial buffer to cores 4, 5, and 6. FIG. 8A illustrates three consecutive instances of a network overlay graph 800. FIG. 8B illustrates an example of a copy-based execution of a network overlay graph by multiple computational nodes with two PSCs in the intermediary computational node to implement double-buffering. As in the previous example, the computational nodes are cores in a multicore processor.

Network overlay graph 800 includes additional branches of nodes that can be used to transfer data in buffers from A1-A3 to B1-B3. The separate branches of the network overlay graph can be independently implemented by the network overlay layer. As illustrated in block diagram 810, the intermediary core 3 includes two PSCs. This can allow the intermediary core to conduct receive and send operations simultaneously by being able to manage more than one buffer at the same time. In the illustrated example, the first set of buffers is transmitted as in the previous example, by copying streams (1), (2), and (3) into streams (4), (5), and (6), which are combined into stream (7) and multicast to the destination cores 4, 5, and 6. The destination cores can then receive the data via streams (8), (9), and (10) respectively. At the same time, and while stream (7) is still being managed by PSC #1 in core 3, PSC #2 in core 3 can start receiving the second set of buffers, by copying streams (11), (12), and (13) into streams (14), (15), and (16), respectively. Streams (14), (15), and (16) can then be combined into stream (17) by PSC #2 in core 3 and multicast to the destination cores 4, 5, and 6. The destination cores can then receive the data via streams (18), (19), and (20) respectively. At the same time, and while stream (17) is still being managed by PSC #2 in core 3, PSC #1 in core 3 can start receiving the third set of buffers, by copying streams (21), (22), and (23) into streams (24), (25), and (26), respectively. Streams (24), (25), and (26) can then be combined into stream (27) by PSC #1 in core 3 and multicast to the destination cores 4, 5, and 6. The destination cores can then receive the data via streams (28), (29), and (30) respectively. As with the previous examples, each PSC can follow a schedule of instructions in order to execute the graph as intended. In the example of FIGS. 8A and 8B, by implementing double buffering, higher performance levels can be achieved since series execution in the intermediary core can be optimized by simultaneous execution of receive and send operations. The double buffering approach is advantageous in that it allows the system to increase consumption of data by the destination nodes of the overlay graph and maximize the overlap of computation and data transfers through the application data flow graph.

Figure 9:
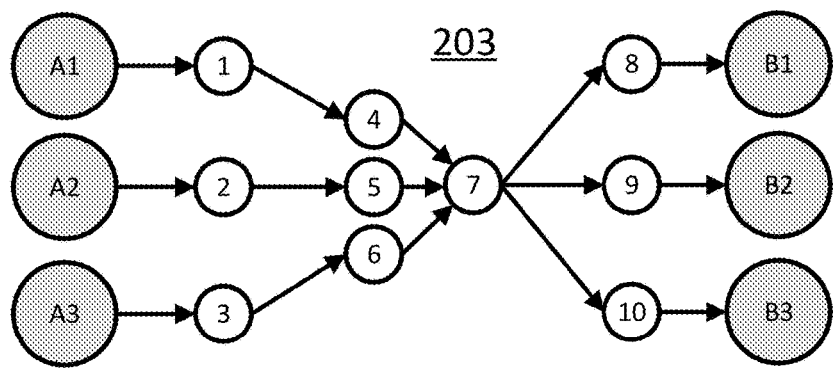
FIG. 9 includes an example of a streaming-based execution of a network overlay graph by multiple computational nodes, each with a varying number of PSCs, in accordance with specific embodiments of the invention disclosed herein.
Figure 9:
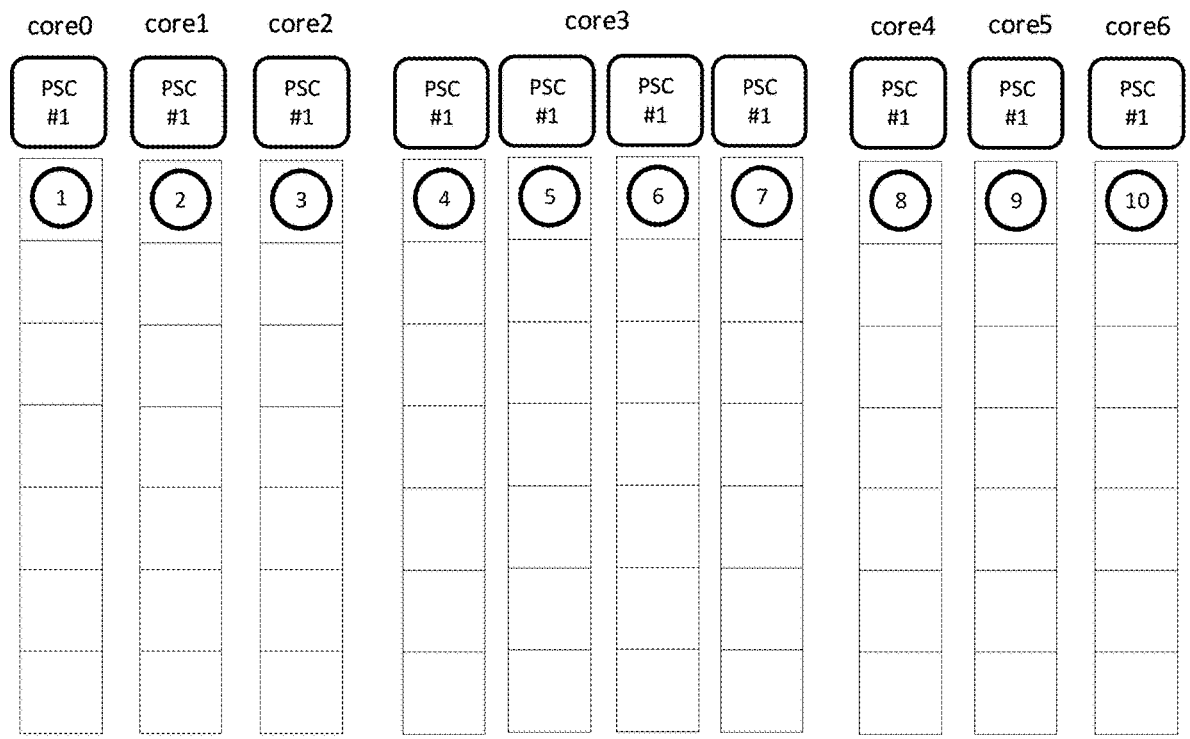

FIG. 9 illustrates an example of a streaming-based execution of a network overlay graph by multiple computational nodes, each with a varying number of PSCs. Diagram 900 illustrates cores 1, 2, 3, 4, 5, and 6 each having a single PSC, and core 3 having four PSCs. Core 3 can be the intermediary core. In this example, "push" and "stream" instructions can be given to the PSCs in order to execute the graph. An example of a schedule of instructions for the PSCs in FIG. 9 is provided in Tables 3A-3B below.

TABLE 3A

Streaming-Cores 0 to 2-Schedule of instructions

| Time step | Core 0 Processing pipeline | Core 0 PSC #1 | Core 1 Processing pipeline | Core 1 PSC #1 | Core 2 Processing pipeline | Core 2 PSC #1 |
|---|---|---|---|---|---|---|
| 0 | Push (A1 packets to VS1 (16 packets) | Stream (16 packets from VS1 to {VS4, core 3}) | Push (A2 packets to VS2 (16 packets) | Stream (16 packets from VS2 to {VS5, core 3}) | Push (A3 packets to VS3 (16 packets) | Stream (16 packets from VS3 to {VS6, core 3}) |

TABLE 3B

Streaming-Core 3-Schedule of instructions

| Time step | Core 3 PSC #1 | Core 3 PSC #2 | Core 3 PSC #3 | Core 3 PSC #4 |
|---|---|---|---|---|
| 0 | Stream(16 packets from VS4 to VS7) | Stream(16 packets from VS5 to VS7) | Stream(16 packets from VS6 to VS7) | Stream(16*3 packets from stream_merge_rr{VS4, VS5, V6} as VS7, multicast to {{VS8, core4}, {VS9, core5}, {VS10, core6}) |

TABLE 3C

Streaming-Cores 4 to 6-Schedule of instructions

| Time step | Core 4 PSC #1 | Core 4 Processing pipeline | Core 5 PSC #1 | Core 5 Processing pipeline | Core 6 PSC #1 | Core 6 Processing pipeline |
|---|---|---|---|---|---|---|
| 0 | Stream (16*3 packets from {VS7, core 4} to VS8) | Pop (B1 packets from VS8 (48 packets)) | Stream (16*3 packets from {VS7, core 5} to VS9) | Pop (B2 packets from VS9 (48 packets)) | Stream (16*3 packets from {VS7, core 6} to VS10) | Pop (B3 packets from VS10 (48 packets)) |

As illustrated in the tables above, core 0 can have instructions to push A1 packets to stream (1). A1 or any data to be transferred can comprise multiple packets. In the streaming operation, the streams do not need to store the full buffer and can be able to just start a single packet. The destination can process packet-by-packet. Therefore, the streams can work at a level of single packets in a buffer even though the full transition comprises multiple packets.

Referring to the example of FIG. 9, core 0 can have instructions to push A1 packets to stream (1), and to stream packets from stream (1) to stream (4) in core 3. In a similar way, core 1 can have instructions to push A2 packets to stream (2) and to stream the packets from stream (2) to stream (5) in core 3. In a similar way, core 2 can have instructions to push A3 packets to stream (3) and to stream packets from stream (3) to stream (6) in core 3. Core 3, in turn, can have instructions to stream packets from streams (4), (5), and (6) to stream (7). In this way, data from different sources can be combined before it is forwarded to the destination. The streaming from streams (4), (5), and (6) is managed by three different PSCs in core 3, one for each source stream. An additional PSC in core 4 can have instructions to stream all the packets from streams (4), (5), and (6) by merging them as stream (7) and multicasting to stream (8) in core 4, stream (9) in core 5 and stream (10) in core 6. Cores 4, 5, and 6 in turn can have instructions to stream the packets from stream (7) in core 3 to streams (8), (9), and (10) respectively, and to pass B1, B2, and B3 packets from streams (8), (9), and (10) respectively. As seen, the streaming example minimizes the time steps required to execute the overlay graph and can allow data to flow through the graph as soon as it is able to but is highly resource intensive.

The examples in FIG. 6-8 serve to illustrate different exemplary implementations of the general method described with reference to FIG. 5. In the different examples, data is provided from source nodes to an intermediary node, combined by the intermediary node, and the multicast to the destination nodes. Although the examples in FIG. 6-9 described before refer to executions of the network overlay graph using the same type of operations for every step of the process, such as memory copy or streaming operations, the operations can be combined in the execution of the same network overlay graph, and the transitions of data can occur in multiple ways in the execution of the same graph.

While the specification has been described in detail with respect to specific embodiments of the invention, it will be appreciated that those skilled in the art, upon attaining an understanding of the foregoing, may readily conceive of alterations to, variations of, and equivalents to these embodiments. For example, although the examples in the disclosure refer mainly to computational nodes that are cores in a multicore processor, computational nodes can be general processing cores, graphics processors, neural network accelerators or any other computational node used in the parallel execution of complex computations. Although the copy and streaming operation were disclosed associated to copy and stream instructions, multiple other instructions can be assigned to the PSC in order to execute the overlay graph. Any of the methods disclosed herein can be executed by a processor in combination with a computer-readable media storing instructions for the methods. These and other modifications and variations to the present invention may be practiced by those skilled in the art, without departing from the scope of the present invention, which is more particularly set forth in the appended claims.

What is claimed is:

1. A method for executing an application data flow graph using a network of computational nodes comprising:
    transitioning first application data from a first source computational node to an intermediary computational node and storing the first application data in a first buffer;
    providing second application data, from a computation layer of the network of computational nodes, on the intermediary computational node and storing the second application data in a second buffer;
    multicasting the first application data in combination with the second application data from the intermediary computational node to at least two destination computational nodes using: (i) at least two network overlay layer instructions that refer to the first application data and the second application data using a single variable; and (ii) two network layer memory copy operations, one from the first buffer and one from the second buffer; and
    wherein the first source computational node, the intermediary computational node, and the at least two destination computational nodes are all in the network of computational nodes.

2. The method of claim 1, further comprising:
    generating network overlay instructions for the multicasting of the first application data in combination with the second application data on the intermediary computational node;
    wherein the multicasting of the first application data in combination with the second application data is conducted by a network layer of the network of computational nodes;
    wherein the network overlay instructions for the multicasting of the first application data in combination with the second application data are executed by a network overlay layer of the network of computational nodes; and
    wherein the first application data and the second application data are from the computation layer of the network of computational nodes.

3. The method of claim 1, wherein:
    the first source computational node and the at least two destination computational nodes are all nodes in the application data flow graph; and
    the intermediary computational node is not a node in the application data flow graph.

4. The method of claim 1, wherein:
    the network of computational nodes is an interconnect fabric; and
    the computational nodes of the network of computational nodes are each selected from a group consisting of: general processing cores, graphics processors, and neural network accelerators.

5. The method of claim 1, wherein:
    the network of computational nodes is a network on chip; and
    the computational nodes of the network of computational nodes are processing cores in a multicore processor.

6. The method of claim 1, further comprising:
    providing the first application data and the second application data to the computation layer of the network of computational nodes on the at least two destination computational nodes;
    wherein the first application data and the second application data are from the computation layer of the network of computational nodes;
    wherein the transitioning of the first application data from the first source computational node to the intermediary computational node is administrated by a network overlay layer of the network of computational nodes; and
    wherein the providing of the second application data on the intermediary computational node is administrated by the network overlay layer of the network of computational nodes.

7. The method of claim 1, further comprising:
    configuring a set of programmable controllers with instructions, wherein the set of programmable controllers are instantiated across the network of computational nodes; and
    wherein the transitioning of the first application data, the providing of the second application data, and the multicasting of the first application data in combination with the second application data, are all conducted by the set of programmable controllers: (i) in accordance with the application data flow graph; and (ii) in response to the execution of the instructions.

8. The method of claim 1, wherein:
    the transitioning of the first application data is conducted using a first programmable controller executing a first streaming instruction;
    the providing of the second application data is conducted using a second programmable controller executing a second streaming instruction;
    the multicasting is conducted using a third programmable controller executing a third streaming instruction;
    the first, second, and third programmable controllers are all instantiated on the intermediary computational node; and
    the first, second, and third streaming instructions are all at least partially executed at the same time.

9. The method of claim 1, wherein:
    the transitioning of the first application data is conducted using a first programmable controller executing a first memory copy instruction;
    the providing of the second application data is conducted using a second programmable controller executing a second streaming instruction;
    the first and second programmable controllers are both instantiated on the intermediary computational node; and
    the first memory copy instruction and the second streaming instruction are at least partially executed at the same time.

10. The method of claim 9, further comprising:
    transitioning third application data from the first source computational node to the intermediary computational node using a second programmable stream controller executing a fourth memory copy instruction at a third time;
    wherein:
    the transitioning of the first application data is conducted using a first programmable controller executing a first memory copy instruction at a first time;
    the providing of the second application data is conducted using the first programmable controller executing a second memory copy instruction at a second time;
    the multicasting is conducted using the first programmable controller executing a third memory copy instruction at the third time; and
    the first and second programmable controllers are both instantiated on the intermediary computational node.

11. A non-transitory computer-readable media storing instructions that, when executed by one or more processors, cause the processors to implement a method for executing an application data flow graph using a network of computational nodes, the method comprising:
- transitioning first application data from a first source computational node to an intermediary computational node and storing the first application data in a first buffer;
- providing second application data, from a computation layer of the network of computational nodes, on the intermediary computational node and storing the second application data in a second buffer;
- multicasting the first application data in combination with the second application data from the intermediary computational node to at least two destination computational nodes using: (i) at least two network overlay layer instructions that refer to the first application data and the second application data using a single variable; and (ii) two network layer memory copy operations, one from the first buffer and one from the second buffer; and
- wherein the first source computational node, the intermediary computational node, and the at least two destination computational nodes are all in the network of computational nodes.

12. The non-transitory computer-readable media of claim 11, wherein the method further comprises:
- generating network overlay instructions for the multicasting of the first application data in combination with the second application data on the intermediary computational node;
- wherein the multicasting of the first application data in combination with the second application data is conducted by a network layer of the network of computational nodes;
- wherein the network overlay instructions for the multicasting of the first application data in combination with the second application data are executed by a network overlay layer of the network of computational nodes; and
- wherein the first application data and the second application data are from the computation layer of the network of computational nodes.

13. The non-transitory computer-readable media of claim 11, wherein:
- the first source computational node and the at least two destination computational nodes are all nodes in the application data flow graph; and
- the intermediary computational node is not a node in the application data flow graph.

14. The non-transitory computer-readable media of claim 11,
wherein:
- the network of computational nodes is an interconnected fabric; and
- the computational nodes of the network of computational nodes are each selected from a group consisting of: general processing cores, graphics processors, and neural network accelerators.

15. The non-transitory computer-readable media of claim 11,
wherein:
- the network of computational nodes is a network on chip; and
- the computational nodes of the network of computational nodes are processing cores in a multicore processor.

16. The non-transitory computer-readable media of claim 11, wherein the method further comprises:
- providing the first application data and the second application data to the computation layer of the network of computational nodes on the at least two destination computational nodes;
- wherein the first application data and the second application data are from the computation layer of the network of computational nodes;
- wherein the transitioning of the first application data from the first source computational node to the intermediary computational node is administrated by a network overlay layer of the network of computational nodes; and
- wherein the providing of the second application data on the intermediary computational node is administrated by the network overlay layer of the network of computational nodes.

17. The non-transitory computer-readable media of claim 11, wherein the method further comprises:
- configuring a set of programmable controllers with instructions, wherein the set of programmable controllers are instantiated across the network of computational nodes; and
- wherein the transitioning of the first application data, the providing of the second application data, and the multicasting of the first application data in combination with the second application data, are all conducted by the set of programmable controllers: (i) in accordance with the application data flow graph; and (ii) in response to the execution of the instructions.

18. The non-transitory computer-readable media of claim 11, wherein:
- the transitioning of the first application data is conducted using a first programmable controller executing a first streaming instruction;
- the providing of the second application data is conducted using a second programmable controller executing a second streaming instruction;
- the multicasting is conducted using a third programmable controller executing a third streaming instruction;
- the first, second, and third programmable controllers are all instantiated on the intermediary computational node; and
- the first, second, and third streaming instructions are all at least partially executed at the same time.

19. The non-transitory computer-readable media of claim 11, wherein:
- the transitioning of the first application data is conducted using a first programmable controller executing a first memory copy instruction;
- the providing of the second application data is conducted using a second programmable controller executing a second streaming instruction;
- the first and second programmable controllers are both instantiated on the intermediary computational node; and
- the first memory copy instruction and the second streaming instruction are at least partially executed at the same time.

20. The non-transitory computer-readable media of claim 19, wherein the method further comprises:
- transitioning third application data from the first source computational node to the intermediary computational node using a second programmable stream controller executing a fourth memory copy instruction at a third time;

wherein:
the transitioning of the first application data is conducted using a first programmable controller executing a first memory copy instruction at a first time;
the providing of the second application data is conducted using the first programmable controller executing a second memory copy instruction at a second time;
the multicasting is conducted using the first programmable controller executing a third memory copy instruction at the third time; and
the first and second programmable controllers are both instantiated on the intermediary computational node.

\* \* \* \* \*